(12) United States Patent
Gouskova et al.

(10) Patent No.: US 12,383,833 B2
(45) Date of Patent: Aug. 12, 2025

(54) OPTIMIZED PLAYER POSITIONING SYSTEM IN VIRTUAL EXPERIENCES

(71) Applicant: Roblox Corporation, San Mateo, CA (US)

(72) Inventors: Polina Gouskova, San Mateo, CA (US); Samuel Bouhadana, San Mateo, CA (US); Zhi Yi Zhang, San Mateo, CA (US)

(73) Assignee: Roblox Corporation, San Mateo, CA (US)

( * ) Notice: Subject to any disclaimer, the term of this patent is extended or adjusted under 35 U.S.C. 154(b) by 282 days.

(21) Appl. No.: 18/313,623

(22) Filed: May 8, 2023

(65) Prior Publication Data

US 2024/0149165 A1    May 9, 2024

Related U.S. Application Data

(60) Provisional application No. 63/423,150, filed on Nov. 7, 2022.

(51) Int. Cl.
| | |
|---|---|
| *A63F 13/56* | (2014.01) |
| *A63F 13/67* | (2014.01) |
| *A63F 13/79* | (2014.01) |
| *A63F 13/798* | (2014.01) |
| *A63F 13/87* | (2014.01) |

(52) U.S. Cl.
CPC .............. *A63F 13/56* (2014.09); *A63F 13/67* (2014.09); *A63F 13/79* (2014.09); *A63F 13/798* (2014.09); *A63F 13/87* (2014.09)

(58) Field of Classification Search
None
See application file for complete search history.

(56) References Cited

U.S. PATENT DOCUMENTS

| | | | |
|---|---|---|---|
| 2010/0060648 A1* | 3/2010 | Carter ..................... | A63F 13/30 345/474 |
| 2010/0105484 A1* | 4/2010 | Horneff ................... | A63F 13/79 463/43 |
| 2015/0246286 A1* | 9/2015 | Branson ................ | A63F 13/424 463/31 |
| 2021/0146258 A1* | 5/2021 | Pedersen .................. | G06N 3/08 |

\* cited by examiner

*Primary Examiner* — Jason T Yen
(74) *Attorney, Agent, or Firm* — IP Spring

(57) ABSTRACT

Implementations described herein relate to methods, systems, and computer-readable media to automatically position players within a virtual experience. A method can include generating graph-based avatar embeddings for a plurality of avatars engaged with a virtual experience hosted on a virtual experience platform, identifying avatars of the plurality of avatars that a new avatar that is not currently in a virtual environment is likely to engage with, determining possible spawn positions for the new avatar in the virtual environment, the possible spawn positions based upon respective distances between the identified avatars, calculating a plurality of spawn positions, ranking the plurality of spawn positions based on a weighted prediction of engagement, and placing the new avatar in the virtual environment at the highest ranked spawn position.

20 Claims, 8 Drawing Sheets

OPTIMIZED PLAYER POSITIONING SYSTEM IN VIRTUAL EXPERIENCES

CROSS-REFERENCE TO RELATED APPLICATIONS

This application claims the benefit of priority to U.S. Provisional Application Ser. No. 63/423,150, filed on Nov. 7, 2022, entitled "ENGAGEMENT-OPTIMIZED PLAYER POSITIONING SYSTEM IN VIRTUAL EXPERIENCES," the entire contents of which are hereby incorporated by reference herein.

TECHNICAL FIELD

Embodiments relate generally to computer-based virtual experiences, and more particularly, to methods, systems, and computer readable media to automatically position players within a virtual experience.

BACKGROUND

Some online virtual experience platforms allow users to access content such as virtual experiences, games, and game assets, connect with each other, interact with each other (e.g., within a game or experience), and share information with each other via the Internet. Users of online virtual experience platforms may participate in multiplayer virtual environments in which games or parts of games have been provided for interaction and/or purchase.

When users are initially positioned within a virtual experience, oftentimes the initial position is a predetermined position near or adjacent an entrance to the virtual experience (e.g., a doorway, gate, road, etc.). Other initial positions may include random positions, drop points, and/or spawn positions chosen at random by the online virtual experience platform. However, such initial positions (e.g., fixed and/or random) introduce drawbacks including lack of immediate engagement, lack of adjacent activity of interest, lack of proximate players the initially positioned player is acquainted with, and other drawbacks.

The background description provided herein is for the purpose of presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations of this application relate to automatically positioning players within a virtual experience.

According to an aspect, a computer-implemented method is disclosed, comprising: generating graph-based avatar embeddings for a plurality of avatars engaged with a virtual experience hosted on a virtual experience platform, the graph-based avatar embeddings representing a map of a virtual environment of the virtual experience, avatar position within the virtual environment for each avatar of the plurality of avatars, and social engagement data for each avatar of the plurality of avatars; identifying avatars of the plurality of avatars that a new avatar that is not currently in the virtual environment is likely to engage with; determining possible spawn positions for the new avatar in the virtual environment, the possible spawn positions based upon respective distances between the identified avatars; calculating a plurality of spawn positions; ranking the plurality of spawn positions based on a weighted prediction of engagement; and placing the new avatar in the virtual environment at the highest ranked spawn position.

In some implementations, generating the graph-based embeddings comprises: translating an avatar social graph representing the plurality of avatars as nodes onto a coordinate plane where respective distances are each a function of social interaction between individual avatars of the plurality of avatars.

In some implementations, identifying the avatars of the plurality of avatars comprises: locating that avatars that are within a vicinity of a presumptive spawn position by retrieving individual avatars from a nearest neighbors index.

In some implementations, the nearest neighbors index includes all avatars within a threshold distance as calculated using a cosine distance function.

In some implementations, calculating a plurality of spawn positions comprises: determining a weighted average of social distances of closest avatars within a visibility radius of a presumptive spawn position of the possible spawn positions.

In some implementations, ranking the plurality of spawn positions comprises, if two or more weighted averages are equivalent to a maximum weighted average, randomly assigning one spawn position associated with the two or more weighted averages as the highest ranked spawn position.

In some implementations, the graph-based avatar embeddings are based upon a social graph, and wherein the social graph comprises nodes representing the plurality of avatars and edges representing social engagement between each pair of avatars of the plurality of avatars.

In some implementations, the social graph is a bi-partite graph further comprising additional nodes that represent virtual activities and additional edges that represent activity engagement data for each avatar of the plurality of avatars and the virtual activities.

In some implementations, a computer-implemented method is disclosed further comprising finding a maximum weighted prediction of engagement with the virtual activities, and wherein ranking the plurality of spawn positions further comprises ranking based on the maximum weighted prediction of engagement.

According to another aspect, a system is disclosed comprising: a memory with instructions stored thereon; and a processing device, coupled to the memory, the processing device configured to access the memory and execute the instructions, wherein the instructions cause the processing device to perform operations comprising: generating graph-based avatar embeddings for a plurality of avatars engaged with a virtual experience hosted on a virtual experience platform, the graph-based avatar embeddings representing a map of a virtual environment of the virtual experience, avatar position within the virtual environment for each avatar of the plurality of avatars, and social engagement data for each avatar of the plurality of avatars; identifying avatars of the plurality of avatars that a new avatar that is not currently in the virtual environment is likely to engage with; determining possible spawn positions for the new avatar in the virtual environment, the possible spawn positions based upon respective distances between the identified avatars; calculating a plurality of spawn positions; ranking the plurality of spawn positions based on a weighted prediction of engagement; and placing the new avatar in the virtual environment at the highest ranked spawn position.

In some implementations, generating the graph-based embeddings comprises: translating an avatar social graph representing the plurality of avatars as nodes onto a coordinate plane where respective distances are each a function of social interaction between individual avatars of the plurality of avatars.

In some implementations, identifying the avatars of the plurality of avatars comprises: locating that avatars that are within a vicinity of a presumptive spawn position by retrieving individual avatars from a nearest neighbors index.

In some implementations, the nearest neighbors index includes all avatars within a threshold distance as calculated using a cosine distance function.

In some implementations, calculating a plurality of spawn positions comprises: determining a weighted average of social distances of closest avatars within a visibility radius of a presumptive spawn position of the possible spawn positions.

In some implementations, ranking the plurality of spawn positions comprises, if two or more weighted averages are equivalent to a maximum weighted average, randomly assigning one spawn position associated with the two or more weighted averages as the highest ranked spawn position.

In some implementations, the graph-based avatar embeddings are based upon a social graph, and wherein the social graph comprises nodes representing the plurality of avatars and edges representing social engagement between each pair of avatars of the plurality of avatars.

In some implementations, the social graph is a bi-partite graph further comprising additional nodes that represent virtual activities and additional edges that represent activity engagement data for each avatar of the plurality of avatars and the virtual activities.

In some implementations, the operations further comprise finding a maximum weighted prediction of engagement with the virtual activities, and wherein ranking the plurality of spawn positions further comprises ranking based on the maximum weighted prediction of engagement.

According to yet another aspect, a non-transitory computer-readable medium is disclosed with instructions stored thereon that, responsive to execution by a processing device, causes the processing device to perform operations comprising: generating graph-based avatar embeddings for a plurality of avatars engaged with a virtual experience hosted on a virtual experience platform, the graph-based avatar embeddings representing a map of a virtual environment of the virtual experience, avatar position within the virtual environment for each avatar of the plurality of avatars, and social engagement data for each avatar of the plurality of avatars; identifying avatars of the plurality of avatars that a new avatar that is not currently in the virtual environment is likely to engage with; determining possible spawn positions for the new avatar in the virtual environment, the possible spawn positions based upon respective distances between the identified avatars; calculating a plurality of spawn positions; ranking the plurality of spawn positions based on a weighted prediction of engagement; and placing the new avatar in the virtual environment at the highest ranked spawn position.

In some implementations, the graph-based avatar embeddings are based upon a social graph, wherein the social graph comprises nodes representing the plurality of avatars and edges representing social engagement between each pair of avatars of the plurality of avatars, wherein the social graph is a bi-partite graph further comprising additional nodes that represent virtual activities and additional edges that represent activity engagement data for each avatar of the plurality of avatars and the virtual activities, wherein the operations further comprise finding a maximum weighted prediction of engagement with the virtual activities, and wherein ranking the plurality of spawn positions further comprises ranking based on the maximum weighted prediction of engagement.

According to yet another aspect, portions, features, and implementation details of the systems, methods, and non-transitory computer-readable media may be combined to form additional aspects, including some aspects which omit and/or modify some or portions of individual components or features, include additional components or features, and/or other modifications; and all such modifications are within the scope of this disclosure.

DETAILED DESCRIPTION

Figure 1:
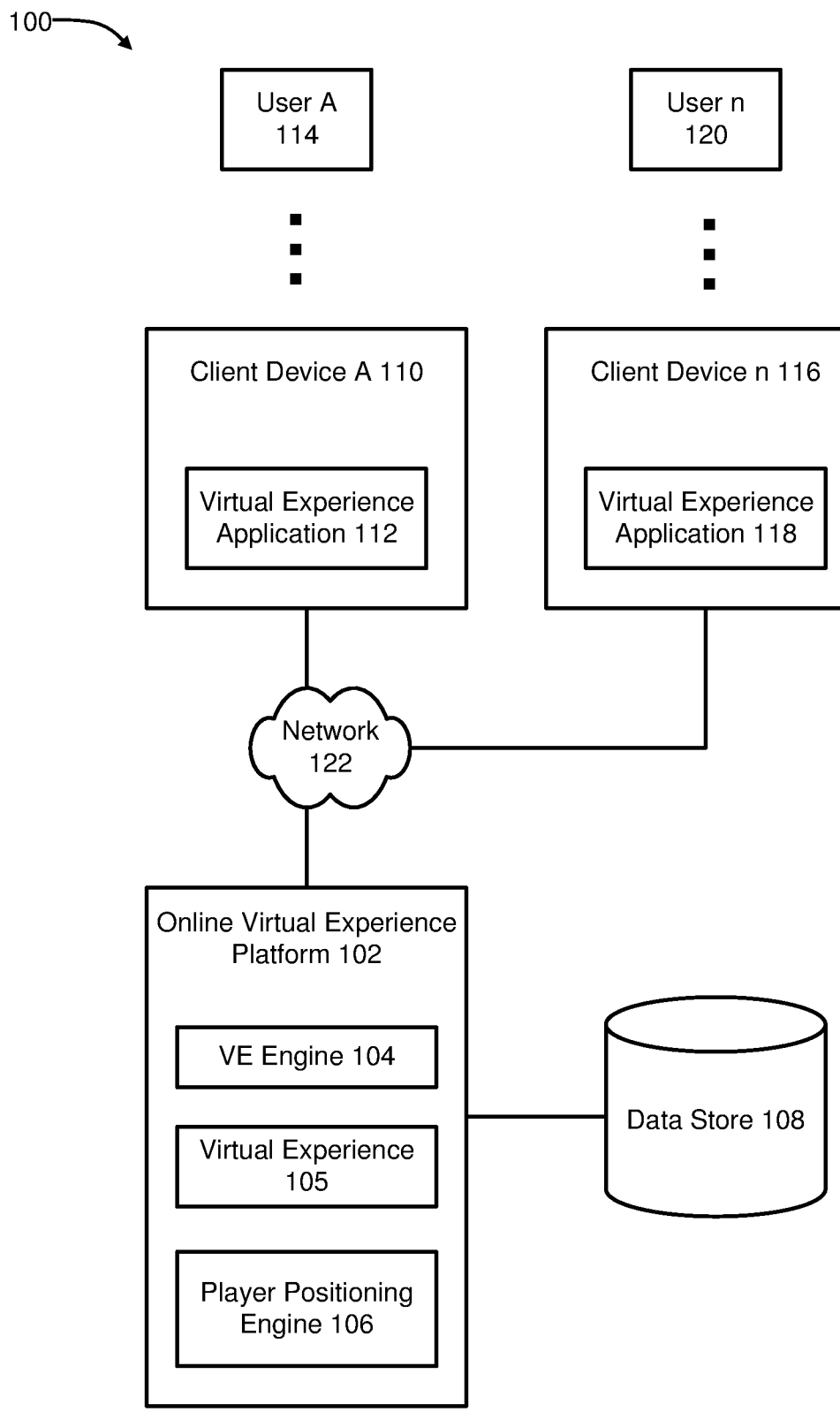
FIG. 1 is a diagram of an example network environment for automatic positioning of players within an online virtual experience, in accordance with some implementations.

One or more implementations described herein relate to automatic positioning of a player based on engagement metrics. For example, engagement metrics can include social engagement, activity engagement, spending engagement, and other engagement metrics. Features can include maintaining a nearest neighbors index based upon the engagement metrics, and automatically positioning new players based on the nearest neighbors index and the engagement metrics.

The maintained nearest neighbors index may be based upon individual player nodes that are mapped to a coordinate plane (e.g., two axes) that represent a two-dimensional plane of a node graph. The positions in this coordinate space allow for a relatively rapid estimation of distance between points to effectuate player positioning based on the data represented by the player nodes.

Accordingly, the coordinates of player nodes allow quantification of the likelihood of an individual user to engage with another entity (e.g., another user, experience, activity, etc.). Given a set of entities on a map of a virtual experience's 3D environment, an estimate of how likely an individual user is to engage with each entity may be determined through calculating a distance between the user's point and the entity's point on the coordinate plane. Thus, an optimal or near-optimal point of entry or "spawning location" may be readily calculated for a particular user based upon the coordinate mapping of nodes as described herein.

Features described herein provide technical effects, advantages, and benefits including improved user engagement (e.g., by increasing the likelihood an avatar engages soon after spawning), increased user playtime (e.g., by decreasing the likelihood an avatar disengages from an experience due to spawn location), decreased resource usage (e.g., by avoiding spawning avatars in non-engagement based positions causing further calculations), and others. These technical effects, advantages, and benefits are directly related to the improved spawning location and other features described herein.

Through implementation of these and other features, players entering a virtual experience are positioned in a manner that increases user engagement, decreases likelihood of a user leaving a virtual experience unsatisfied, and overcomes many drawbacks of conventional, random player positioning.

Online virtual experience platforms (also referred to herein as "user-generated content platforms" or "user-generated content systems") offer a variety of ways for users to interact with one another. For example, users of an online virtual experience platform may create experiences, games or other content or resources (e.g., characters, graphics, items for game play within a virtual world, etc.) within the virtual experience platform.

Users of an online virtual experience platform may work together towards a common goal in a game or in game creation, share various virtual gaming items, send electronic messages to one another, and so forth. Users of an online virtual experience platform may play games, e.g., including characters (avatars) or other game objects and mechanisms. An online virtual experience platform may also allow users of the platform to communicate with each other. For example, users of the online virtual experience platform may communicate with each other using voice messages (e.g., via voice chat), text messaging, video messaging, or a combination of the above. Some online virtual experience platforms can provide a virtual three-dimensional environment in which users can play an online game or engage with various other users and virtual activities.

As described herein, when a user decides to enter a virtual experience, the user's avatar may be positioned based on a plurality of factors, including social engagement opportunities, activity engagement opportunities, and similar factors. Hereinafter, a more detailed description of a system architecture of an online virtual experience platform with automatic player positioning to increase user engagement is provided.

FIG. 1: System Architecture

FIG. 1 illustrates an example network environment 100, in accordance with some implementations of the disclosure. The network environment 100 (also referred to as "system" herein) includes an online virtual experience platform 102, a first client device 110, and a second client device 116 (generally referred to as "client devices 110/116" herein), all coupled via network 122. The online virtual experience platform 102 can include, among other things, a virtual experience engine 104, one or more virtual experiences 105, a player positioning engine 106, and a data store 108. The client device 110 can include a virtual experience application 112. The client device 116 can include a virtual experience application 118. Users 114 and 120 can use client devices 110 and 116, respectively, to interact with the online virtual experience platform 102.

Network environment 100 is provided for illustration. In some implementations, the network environment 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof.

In some implementations, the data store 108 may be a non-transitory computer readable memory (e.g., random access memory), a cache, a drive (e.g., a hard drive), a flash drive, a database system, or another type of component or device capable of storing data. The data store 108 may also include multiple storage components (e.g., multiple drives or multiple databases) that may also span multiple computing devices (e.g., multiple server computers).

In some implementations, the online virtual experience platform 102 can include a server having one or more computing devices (e.g., a cloud computing system, a rackmount server, a server computer, cluster of physical servers, virtual server, etc.). In some implementations, a server may be included in the online virtual experience platform 102, be an independent system, or be part of another system or platform.

In some implementations, the online virtual experience platform 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online virtual experience platform 102 and to provide a user with access to online virtual experience platform 102. The online virtual experience platform 102 may also include a website (e.g., one or more webpages) or application back-end software that may be used to provide a user with access to content provided by online virtual experience platform 102. For example, users may access online virtual experience platform 102 using the virtual experience application 112/118 on client devices 110/116, respectively.

In some implementations, online virtual experience platform 102 may include a type of social network providing connections between users or a type of user-generated content system that allows users (e.g., end-users or consumers) to communicate with other users via the online virtual experience platform 102, where the communication may include voice chat (e.g., synchronous and/or asynchronous voice communication), video chat (e.g., synchronous and/or asynchronous video communication), or text chat (e.g., synchronous and/or asynchronous text-based communication). In some implementations of the disclosure, a "user" may be represented as a single individual. However, other implementations of the disclosure encompass a "user" (e.g., creating user) being an entity controlled by a set of users or an automated source. For example, a set of individual users federated as a community or group in a user-generated content system may be considered a "user."

In some implementations, the virtual experience platform may provide single-player or multiplayer games and/or virtual experiences to a community of users that may access or interact with games (e.g., user generated games or other games) using client devices 110/116 via network 122. In some implementations, games (also referred to as "video game," "online game," or "virtual game" herein) may be two-dimensional (2D) games, three-dimensional (3D) games (e.g., 3D user-generated games), virtual reality (VR) games, or augmented reality (AR) games, for example. In some implementations, users may search for games and game items, and participate in gameplay with other users in one or more games. In some implementations, a game may be played in real-time with other users of the game.

In some implementations, other collaboration platforms and associated social data can be used with the positioning features described herein instead of or in addition to online virtual experience platform 102. For example, a social networking platform, purchasing platform, messaging platform, creation platform, etc. can be used with the positioning features such that users are initially positioned within a virtual environment based on associated social data and prior user engagement data.

In some implementations, gameplay may refer to interaction of one or more players using client devices (e.g., 110 and/or 116) within a virtual experience (e.g., 105) or a game, or the presentation of the interaction on a display or other output device of a client device 110 or 116.

One or more virtual experiences 105 are provided by the online virtual experience platform. In some implementations, a virtual experience 105 can include an electronic file that can be executed or loaded using software, firmware or hardware configured to present the virtual content (e.g., digital media item) to an entity. In some implementations, a virtual experience application 112/118 may be executed and a virtual experience 105 rendered in connection with a virtual experience engine 104. In some implementations, a virtual experience 105 may have a common set of rules or common goal, and the environments of a virtual experience 105 share the common set of rules or common goal. In some implementations, different virtual experiences may have different rules or goals from one another.

In some implementations, virtual experiences may have one or more environments (also referred to as "gaming environments" or "virtual environments" herein) where multiple environments may be linked. An example of an environment may be a three-dimensional (3D) environment. The one or more environments of a virtual experience 105 may be collectively referred to a "world" or "gaming world" or "virtual world" or "universe" or "metaverse" herein. An example of a world may be a 3D world of a virtual experience 105. For example, a user may build a virtual environment that is linked to another virtual environment created by another user. A character of the virtual experience may cross the virtual border to enter the adjacent virtual environment.

It may be noted that 3D environments or 3D worlds use graphics that use a three-dimensional representation of geometric data representative of game content (or at least present game content to appear as 3D content whether or not 3D representation of geometric data is used). 2D environments or 2D worlds use graphics that use two-dimensional representation of geometric data representative of game content.

In some implementations, the online virtual experience platform 102 can host one or more virtual experiences 105 and can permit users to interact with the virtual experiences 105 (e.g., search for new experiences, games, virtual content, or other content) using a virtual experience application 112/118 of client devices 110/116. Users (e.g., 114 and/or 120) of the online virtual experience platform 102 may play, create, interact with, or build virtual experiences 105, search for virtual experiences 105, communicate with other users, create and build objects (e.g., also referred to as "item(s)" or "game objects" or "virtual game item(s)" herein) of virtual experiences 105, and/or search for objects. For example, in generating user-generated virtual items, users may create characters, decoration for the characters, one or more virtual environments for an interactive experience, or build structures used in a virtual experience 105, among others.

In some implementations, users may buy, sell, or trade game virtual objects, such as in-platform currency (e.g., virtual currency), with other users of the online virtual experience platform 102. In some implementations, online virtual experience platform 102 may transmit game content to virtual experience applications (e.g., 112). In some implementations, game content (also referred to as "content" herein) may refer to any data or software instructions (e.g., game objects, game, user information, video, images, commands, media item, etc.) associated with online virtual experience platform 102 or game applications.

In some implementations, virtual objects (e.g., also referred to as "item(s)" or "objects" or "virtual game item(s)" herein) may refer to objects that are used, created, shared or otherwise depicted in virtual experience applications 105 of the online virtual experience platform 102 or virtual experience applications 112 or 118 of the client devices 110/116. For example, virtual objects may include a part, model, character, tools, weapons, clothing, buildings, vehicles, currency, flora, fauna, components of the aforementioned (e.g., windows of a building), and so forth.

It may be noted that the online virtual experience platform 102 hosting virtual experiences 105, is provided for purposes of illustration, rather than limitation. In some implementations, online virtual experience platform 102 may host one or more media items that can include communication messages from one user to one or more other users. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, a virtual experience 105 may be associated with a particular user or a particular group of users (e.g., a private game), or made widely available to users of the online virtual experience platform 102 (e.g., a public game). In some implementations, where online virtual experience platform 102 associates one or more virtual experiences 105 with a specific user or group of users, online virtual experience platform 102 may associated the specific user(s) with a virtual experience 105 using user account information (e.g., a user account identifier such as username and password). Similarly, in some implementations, online virtual experience platform 102 may associate a specific developer or group of developers with a virtual experience 105 using developer account information (e.g., a developer account identifier such as a username and password).

In some implementations, online virtual experience platform 102 or client devices 110/116 may include a virtual experience engine 104 or virtual experience application 112/118. The virtual experience engine 104 can include a virtual experience application similar to virtual experience application 112/118. In some implementations, virtual experience engine 104 may be used for the development or execution of virtual experience 105. For example, virtual experience engine 104 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the virtual experience engine 104 may generate commands that help compute and render the virtual experience (e.g., rendering commands, collision commands, physics commands, etc.). In some implementations, virtual experience applications 112/118 of client devices 110/116, respectively, may work independently, in collaboration with virtual experience engine 104 of online virtual experience platform 102, or a combination of both.

In some implementations, both the online virtual experience platform 102 and client devices 110/116 execute a virtual experience engine (104, 112, and 118, respectively). The online virtual experience platform 102 using virtual experience engine 104 may perform some or all the engine functions (e.g., generate physics commands, rendering commands, etc.), or offload some or all the engine functions to virtual experience engine 104 of client device 110. In some implementations, each virtual experience 105 may have a different ratio between the virtual experience engine functions that are performed on the online virtual experience platform 102 and the virtual experience engine functions that are performed on the client devices 110 and 116.

For example, the virtual experience engine 104 of the online virtual experience platform 102 may be used to generate physics commands in cases where there is a collision between at least two virtual objects, while the additional engine functionality (e.g., generate rendering commands) may be offloaded to the client device 110. In some implementations, the ratio of engine functions performed on the online virtual experience platform 102 and client device 110 may be changed (e.g., dynamically) based on play conditions. For example, if the number of users participating in interactions of a virtual experience 105 exceeds a threshold number, the online virtual experience platform 102 may perform one or more engine functions that were previously performed by the client devices 110 or 116.

For example, users may be playing a virtual experience 105 on client devices 110 and 116, and may send control instructions (e.g., user inputs, such as right, left, up, down, user election, or character position and velocity information, etc.) to the online virtual experience platform 102. Subsequent to receiving control instructions from the client devices 110 and 116, the online virtual experience platform 102 may send play instructions (e.g., spawning position and velocity information of the characters participating in the group gameplay or commands, such as rendering commands, collision commands, etc.) to the client devices 110 and 116 based on control instructions. For instance, the online virtual experience platform 102 may perform one or more logical operations (e.g., using virtual experience engine 104) on the control instructions to generate play instruction for the client devices 110 and 116. In other instances, online virtual experience platform 102 may pass one or more or the control instructions from one client device 110 to other client devices (e.g., 116) participating in the virtual experience 105. The client devices 110 and 116 may use the play instructions and render the acts for presentation on the displays of client devices 110 and 116.

In some implementations, the control instructions may refer to instructions that are indicative of in-experience actions of a user's character. For example, control instructions may include user input to control the in-experience action, such as right, left, up, down, user selection, gyroscope position and orientation data, force sensor data, etc. The control instructions may include character position and velocity information. In some implementations, the control instructions are sent directly to the online virtual experience platform 102. In other implementations, the control instructions may be sent from a client device 110 to another client device (e.g., 116), where the other client device generates play instructions using the local virtual experience engine 104. The control instructions may include instructions to play a voice communication message or other sounds from another user on an audio device (e.g., speakers, headphones, etc.).

In some implementations, play instructions may refer to instructions that allow a client device 110 (or 116) to render gameplay of a game, such as a multiplayer game. The gameplay instructions may include one or more of user input (e.g., control instructions), character position and velocity information, or commands (e.g., physics commands, rendering commands, collision commands, etc.). As described in more detail herein, gameplay instructions issued by a user may affect a user engagement score for one or more activities and/or a social score for interactions with other users. These scores may be a numerical representation of a likelihood of future interaction with users and/or activities and/or portions of a virtual experience. The associated score may be stored in the data store 108 by the online virtual experience platform 102

In some implementations, characters (or game objects generally) are constructed from components, one or more of which may be selected by the user, that automatically join together to aid the user in editing. One or more characters (also referred to as an "avatar" or "model" herein) may be associated with a user where the user may control the character to facilitate a user's interaction with the virtual experience 105. In some implementations, a character may include components such as body parts (e.g., hair, arms, legs, etc.) and accessories (e.g., t-shirt, glasses, decorative images, tools, etc.). In some implementations, body parts of characters that are customizable include head type, body part types (arms, legs, torso, and hands), face types, hair types, and skin types, among others. In some implementations, the accessories that are customizable include clothing (e.g., shirts, pants, hats, shoes, glasses, etc.), weapons, or other tools.

In some implementations, the user may also control the scale (e.g., height, width, or depth) of a character or the scale of components of a character. In some implementations, the user may control the proportions of a character (e.g., blocky, anatomical, etc.). It may be noted that is some implementations, a character may not include a character game object (e.g., body parts, etc.) but the user may control the character (without the character game object) to facilitate the user's interaction with the virtual experience (e.g., a puzzle game where there is no rendered character game object, but the user still controls a character to control in-game action).

In some implementations, a component, such as a body part, may be a primitive geometrical shape such as a block, a cylinder, a sphere, etc., or some other primitive shape such as a wedge, a torus, a tube, a channel, etc. In some implementations, a creator module may publish a user's character for view or use by other users of the online virtual experience platform 102. In some implementations, creating, modifying, or customizing characters, other game objects, virtual experiences 105, or virtual environments may be performed by a user using a user interface (e.g., developer interface) and with or without scripting (or with or without an application programming interface (API)). It may be noted that for purposes of illustration, rather than limitation, characters are described as having a humanoid form. In may further be noted that characters may have any form such as a vehicle, animal, inanimate object, or other creative form.

In some implementations, the online virtual experience platform 102 may store characters created by users in the data store 108. In some implementations, the online virtual experience platform 102 maintains a character catalog and game/experience catalog that may be presented to users via the virtual experience engine 104, virtual experience 105, and/or client device 110/116. In some implementations, the catalog includes images of experiences stored on the online virtual experience platform 102. In addition, a user may select a character (e.g., a character created by the user or other user) from the character catalog to participate in the chosen virtual experience and be positioned therein based on the aspects described herein. The character catalog includes images of characters stored on the online virtual experience platform 102. In some implementations, one or more of the characters in the character catalog may have been created or customized by the user. In some implementations, the chosen character may have character settings defining one or more of the components of the character.

In some implementations, a user's character can include a configuration of components, where the configuration and appearance of components and more generally the appearance of the character may be defined by character settings. In some implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by the online virtual experience platform 102.

In some implementations, the client device(s) 110 or 116 may each include computing devices such as personal computers (PCs), mobile devices (e.g., laptops, mobile phones, smart phones, tablet computers, or netbook computers), network-connected televisions, gaming consoles, etc. In some implementations, a client device 110 or 116 may also be referred to as a "user device." In some implementations, one or more client devices 110 or 116 may connect to the online virtual experience platform 102 at any given moment. It may be noted that the number of client devices 110 or 116 is provided as illustration, rather than limitation. In some implementations, any number of client devices 110 or 116 may be used.

In some implementations, each client device 110 or 116 may include an instance of the virtual experience application 112 or 118, respectively. In one implementation, the virtual experience application 112 or 118 may permit users to use and interact with online virtual experience platform 102, such as search for a game or other content, control a virtual character in a virtual game hosted by online virtual experience platform 102, or view or upload content, such as virtual experiences 105, images, video items, web pages, documents, and so forth. In one example, the virtual experience application may be a web application (e.g., an application that operates in conjunction with a web browser) that can access, retrieve, present, or navigate content (e.g., virtual character in a virtual environment, etc.) served by a web server. In another example, the virtual experience application may be a native application (e.g., a mobile application, app, or a gaming program) that is installed and executes local to client device 110 or 116 and allows users to interact with online virtual experience platform 102. The virtual experience application may render, display, or present the content (e.g., a web page, a user interface, a media viewer) to a user. In an implementation, the virtual experience application may also include an embedded media player (e.g., a Flash® player) that is embedded in a web page.

According to aspects of the disclosure, the virtual experience application 112/118 may be an online virtual experience platform application for users to build, create, edit, upload content to the online virtual experience platform 102 as well as interact with online virtual experience platform 102 (e.g., interact with virtual experiences 105 hosted by online virtual experience platform 102). As such, the virtual experience application 112/118 may be provided to the client device 110 or 116 by the online virtual experience platform 102. In another example, the virtual experience application 112/118 may be an application that is downloaded from a server.

In some implementations, a user may login to online virtual experience platform 102 via the virtual experience application. The user may access a user account by providing user account information (e.g., username and password) where the user account is associated with one or more characters available to participate in one or more virtual experiences 105 of online virtual experience platform 102. Social graph data and/or bi-partite graph data associated with the user account information may be used to inform the player positioning engine 106 of possible positioned to render the user's avatar. Accordingly, upon selection of a virtual experience in which to interact, the player positioning engine 106 may render or "spawn" an avatar in an optimized or improved position that takes into consideration both social and activity contexts.

In general, functions described as being performed by the online virtual experience platform 102 can also be performed by the client device(s) 110 or 116, or a server, in other implementations if appropriate. In addition, the functionality attributed to a particular component can be performed by different or multiple components operating together. The online virtual experience platform 102 can also be accessed as a service provided to other systems or devices through appropriate application programming interfaces (APIs), and thus is not limited to use in websites.

In some implementations, online virtual experience platform 102 may include player positioning engine 106. In some implementations, the player positioning engine 106 may be a system, application, or module that determines an optimized or improved initial player position for a game or virtual experience, a user, and/or a developer. The player position may be reflective of a numerical measure of likelihood that the associated user will be able to immediately engage with other users (e.g., known users) and/or activities (e.g., likely activities to be performed). The initial position may be determined through calculation of a most attractive area for spawning a user's avatar based upon a plurality of factors including social-informed factors and activity-informed factors.

Hereinafter, social-informed factors are described more fully with reference to FIGS. 2-3.

Figure 2:
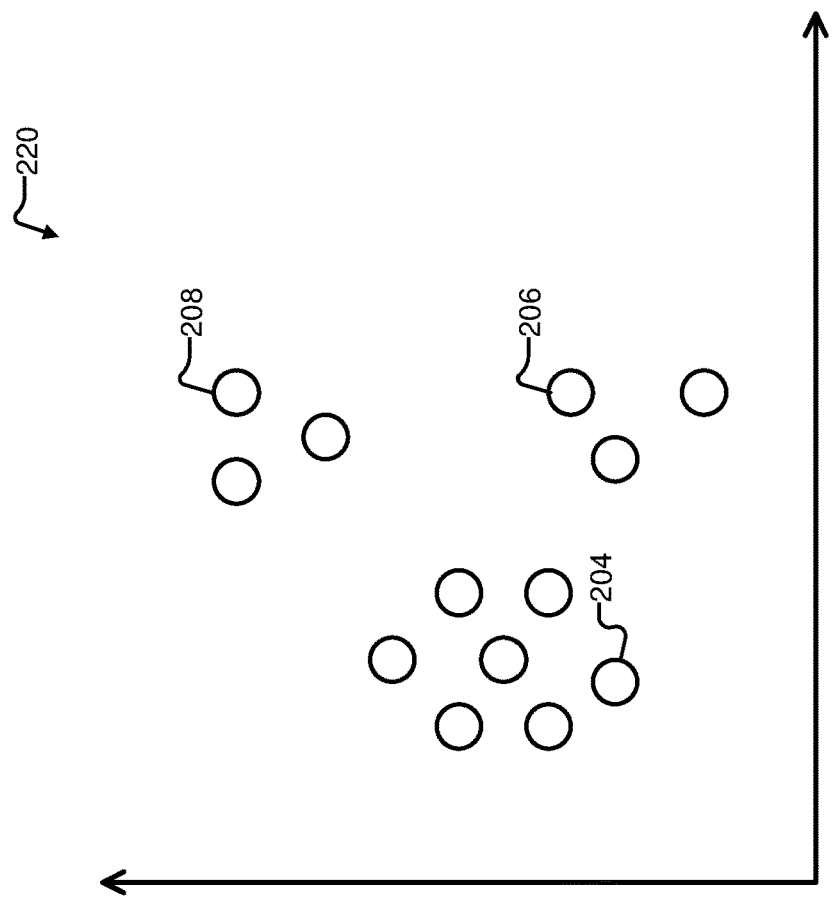
FIG. 2 is a diagram of graph-based user embeddings based on social graphs, in accordance with some implementations.
Figure 2:
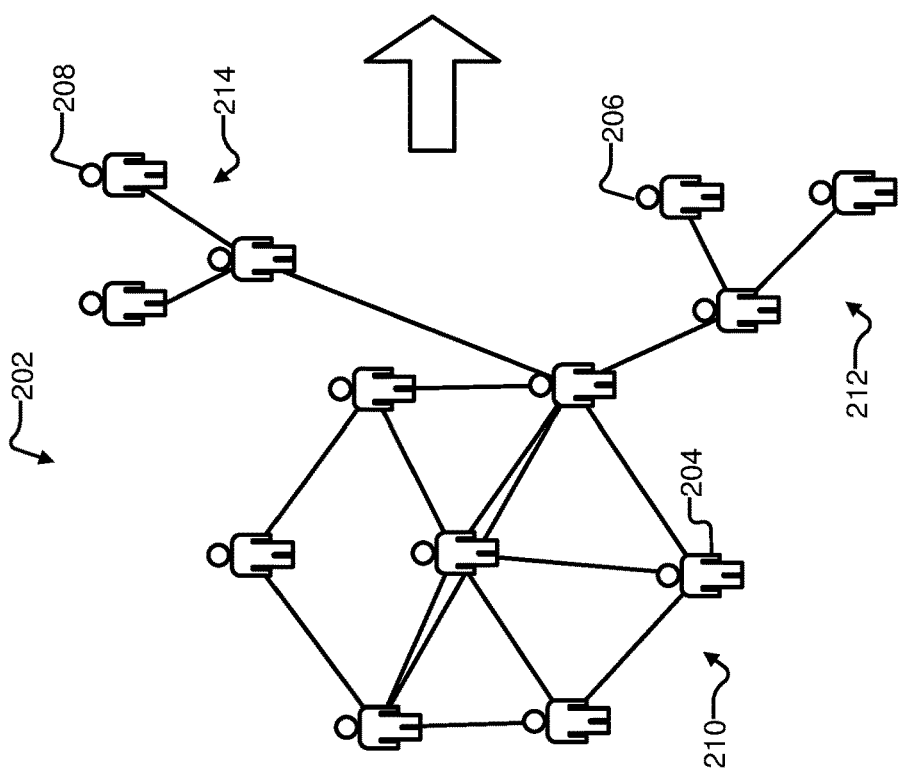
Figure 3:
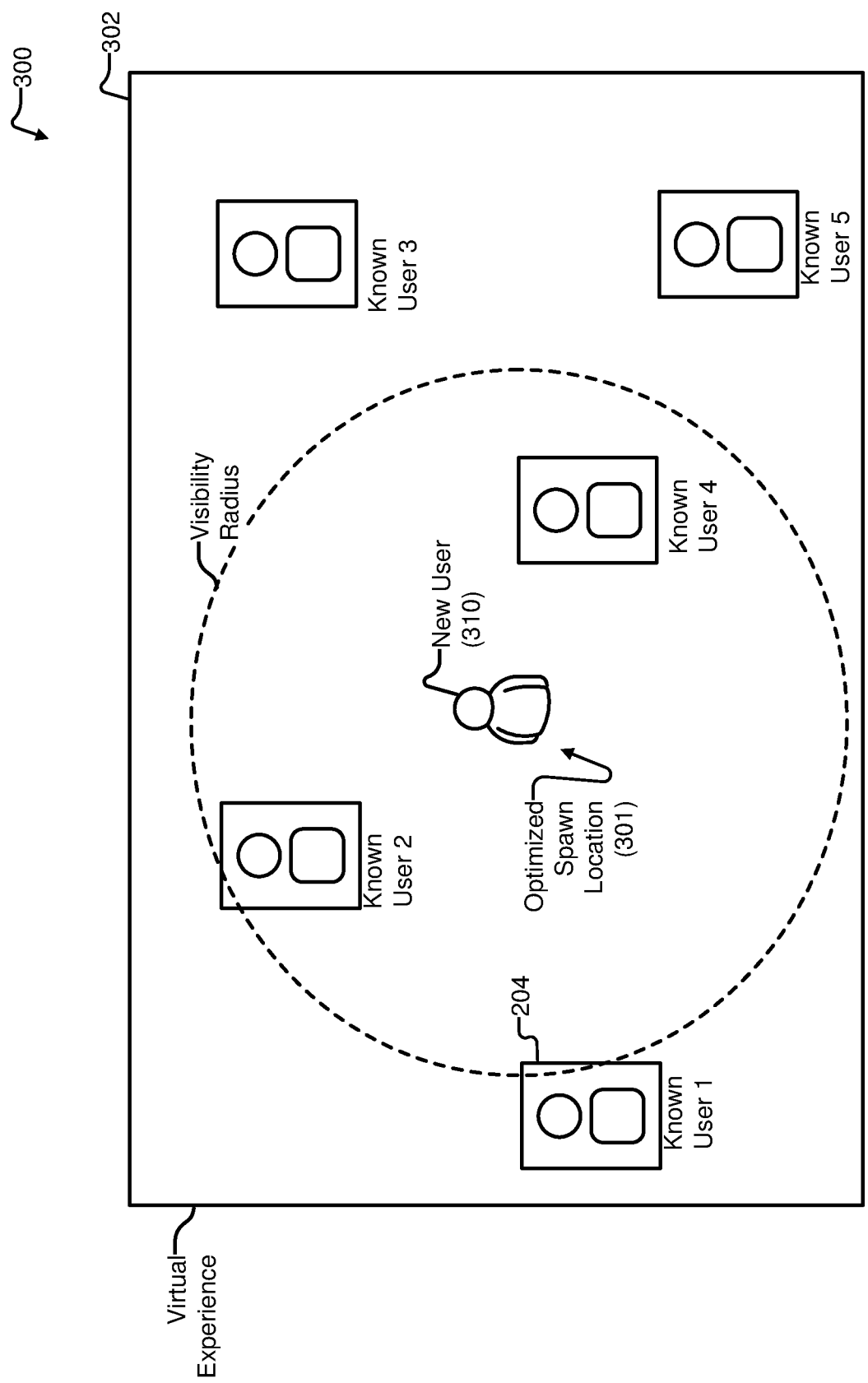
FIG. 3 is a schematic of optimized player positioning based on social graphs, in accordance with some implementations

FIGS. 2-3: Social-Informed Positioning

FIG. 2 is a diagram of graph-based user embeddings based on social graphs, in accordance with some implementations. As shown in FIG. 2, two separate simplified diagrams, diagram 202 and diagram 220, are provided for reference.

In diagram 202, each node represents the same kind of entity: a user. For simplicity of view, each user is not numbered. However, example users 204, 206, and 208 have been labeled for clarity. The users are positioned in the diagram 202 based on actual positions within a virtual environment, such as a virtual environment of a virtual experience provided by the platform 100. As further illustrated, several edges are provided in the diagram 202.

As illustrated, each edge represents a "friendship" (or potentially a communication or other engagement). For simplicity of view, each edge is not numbered. However, example edges 210, 212, and 214 have been labeled for clarity. The edges include a one-to-one correlation of users having a friendship. Accordingly, each edge includes a friendship between two users. Each edge may also include other data, such as a measure or weight based upon frequency of engagement, strength of engagement, type of friendship, and/or other similar data.

Diagram 220 is an embedding plot of the users and edges of the diagram 202, translated into a coordinate plane. The embedding plot is therefore a simplification of the diagram 202 that enables easy retrieval of nearest items (e.g., most likely to have an edge with the current node/user) by distance on the coordinate plane. As such, the diagram 220 represents the users of diagram 202 as a set of points on a coordinate plane where the distance between them represents the likelihood of an edge existing between them.

The positions in coordinate space that the nodes are mapped to are called the node's embeddings. This form of translation may be termed a "graph node embedding model." The translation into the coordinate system allows "simple math" (distance between points in a coordinate plane) to estimate relationships in a network graph (finding the exact solutions using a graph representation is much more difficult mathematically).

In at least one implementation, a trained model or a distributed system for learning graph embeddings may be used to create the coordinate plane 220. The trained model may optimize the node positions such that their cosine distance between each other is predictive of an edge. Given that an edge between nodes is defined in this disclosure as an engagement, a prediction of engagement can be calculated between any two nodes by taking the cosine distance between their points in coordinate space. In some implementations, the described trained model can be replaced with any other graph embedding model. Furthermore, the distance measure (e.g., cosine distance) may also be replaced with another distance measuring function.

Using data obtained through calculation in the coordinate system of diagram 220, an optimized or improved spawn position for a user wishing to join a virtual experience (e.g., spawning into the environment 202) may be determined. For example, FIG. 3 is a schematic of optimized player positioning based on social graphs, in accordance with some implementations.

As shown, an optimized or improved spawn position 301 for a new user 310 may be located within the virtual environment 302. It is noted that the virtual environment 302 is roughly equivalent to the virtual environment mapped in diagram 202. As such, known users 1, 2, 3, 4, and 5 are also represented on the diagram 202, while the new user 310 is not.

Accordingly, based upon the information obtained through examination of the coordinate plane 220, the optimized or improved spawn position 301 represents a spawn position having improved chances of the new user 310 having a visibility radius that includes a user (e.g. 204) and other users to which the user 310 is likely to engage with, based upon social information. The social information may include a list or ranking of established friendships or prior interactions, and the new spawn position 301 may take into consideration the list or established friendships through simple calculations of nearest neighbors on the coordinate plane 320.

As described above with reference to FIG. 2 and FIG. 3, social-informed factors allow the player positioning engine 106 to initially spawn a user's avatar in an optimized or improved position that is likely to increase social engagement almost immediately upon spawning. The player positioning engine 106 may also consider activity-informed factors in player positioning.

Hereinafter, activity-informed factors are described more fully with reference to FIGS. 4-5.

Figure 4:
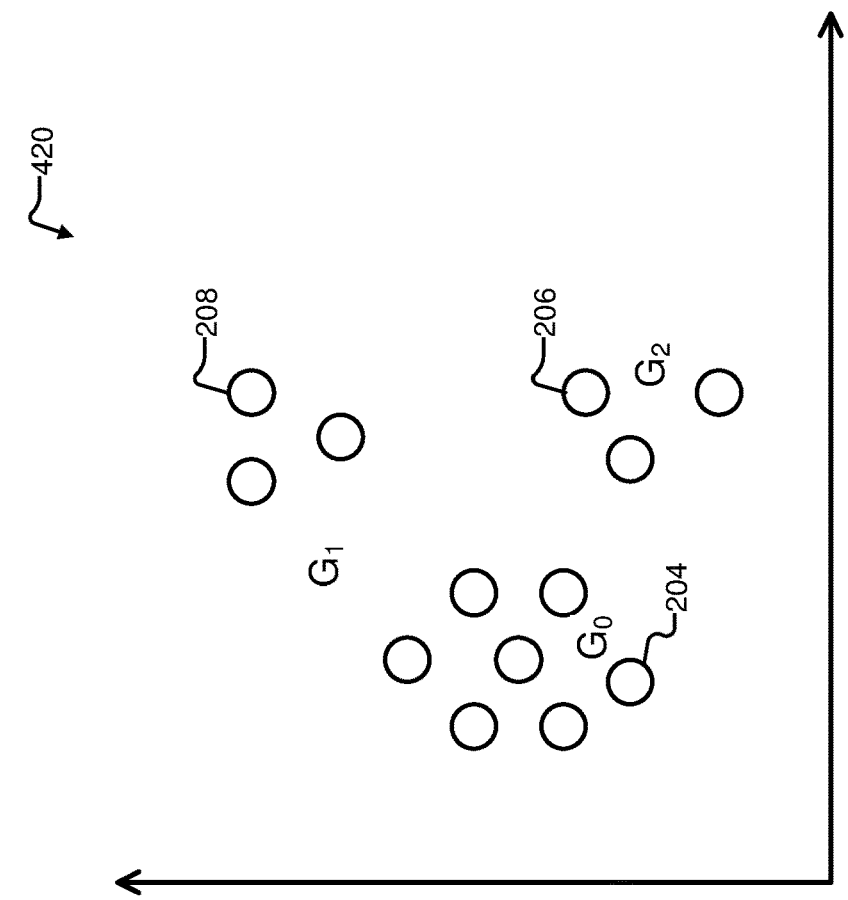
FIG. 4 is a diagram of graph-based user embeddings based on bi-partite graphs, in accordance with some implementations.
Figure 4:
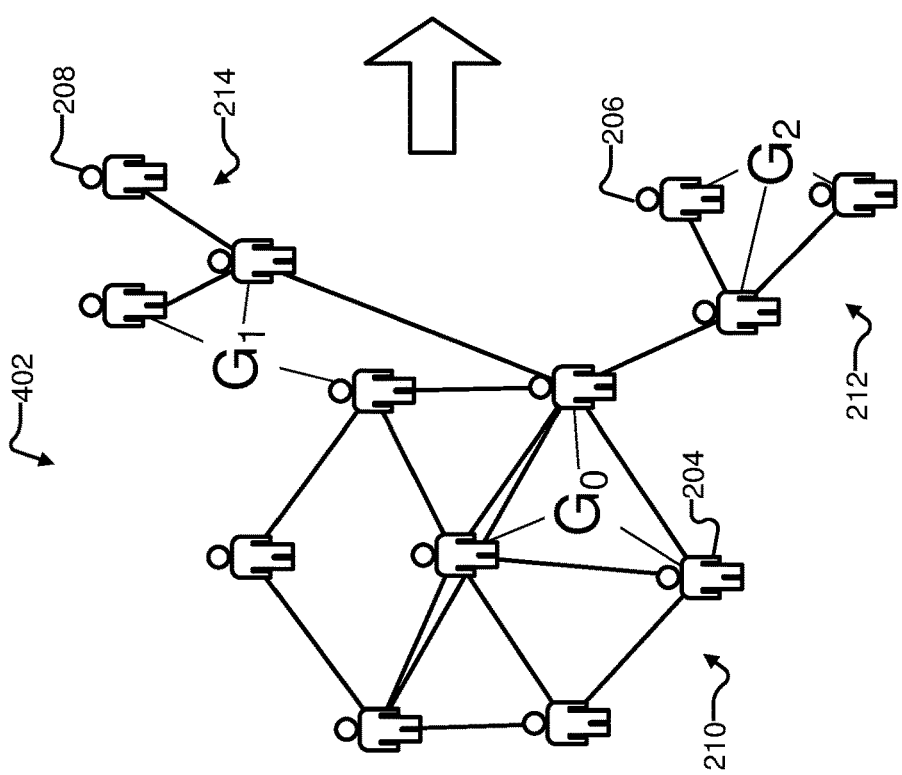
Figure 5:
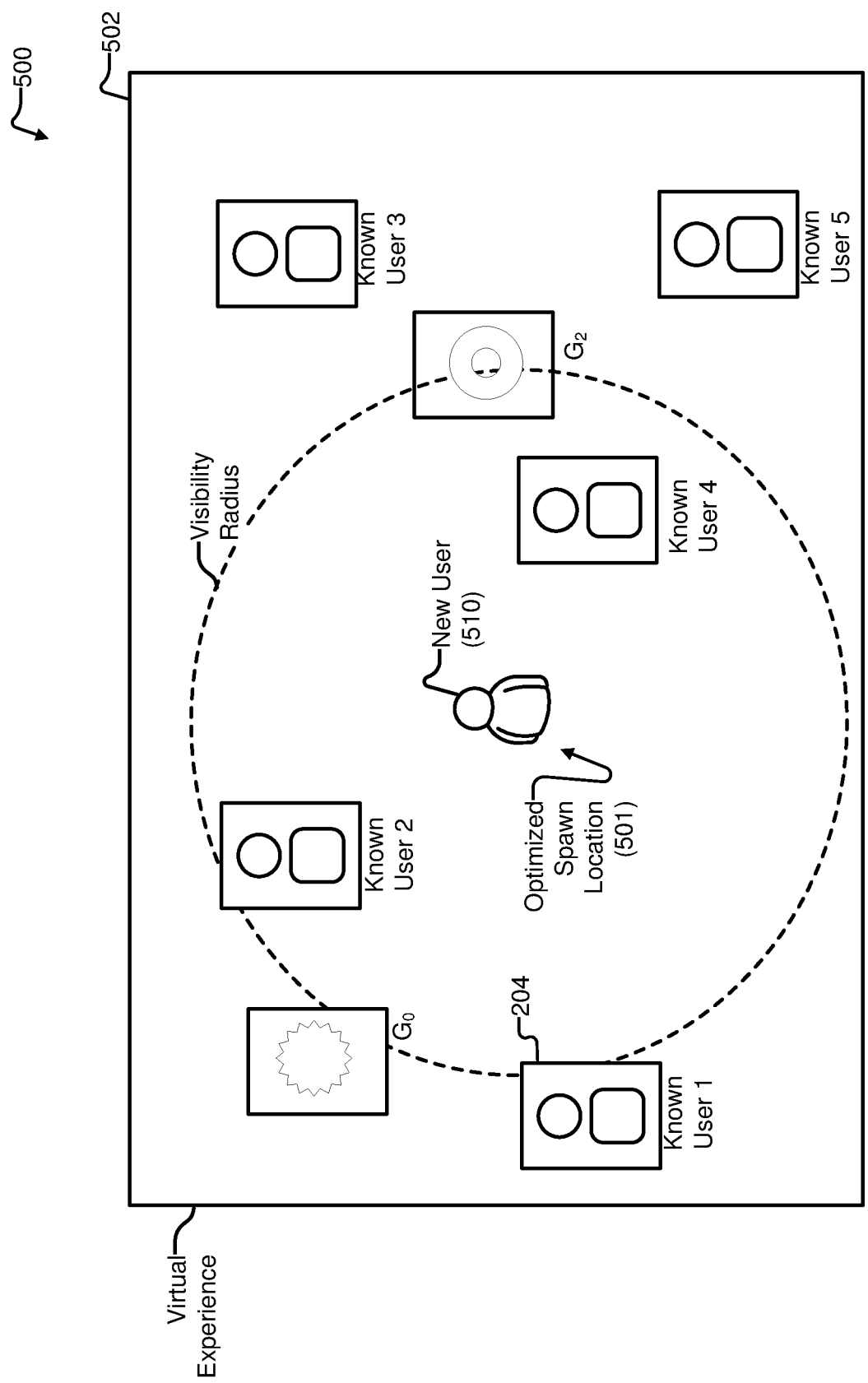
FIG. 5 is a schematic of optimized player positioning based on bi-partite graphs, in accordance with some implementations.

FIGS. 4-5: Activity-Informed Positioning

FIG. 4 is a diagram of graph-based user embeddings based on bi-partite graphs, in accordance with some implementations. As shown in FIG. 4, two separate simplified diagrams, diagram 402 and diagram 420, are provided for reference.

Diagram 402 includes all of the information from diagram 202, with the addition of activities $G_0$, $G_1$, and $G_2$. The activities $G_0$, $G_1$, and $G_2$ have been added as a new node element, representing new activities, known activities, virtual experiences, new virtual environment portals, and/or virtually any virtual element that can be represented as a node on a graph. Therefore, in this example diagram 402, the illustrated graph is a bi-partite graph illustrating both users and activities.

In some implementations, a separate node graph having only virtual items, only activities, only virtual experience portals, and other variations are also applicable. Such variations are similar to diagram 202, with the replacement of user nodes with the particular activity or virtual item type nodes.

Turning back to FIG. 4, the new bi-partite activity nodes of $G_0$, $G_1$, and $G_2$ have also been translated onto the coordinate plane in diagram 420. As shown, simplified distance calculations may be performed to determine an optimal and/or improved spawn position for new user 310.

In at least one implementation, a trained model or a distributed system for learning graph embeddings may be used to create the coordinate plane 420 in a similar manner as coordinate plane 220. The trained model may optimize the node positions (including bi-partitie nodes representative of activities) such that their cosine distance between each other is predictive of an edge. A prediction of engagement can be calculated between any two nodes by taking the cosine distance between their points in coordinate space. In some implementations, the described trained model can be replaced with any other graph embedding model. Furthermore, the distance measure (e.g., cosine distance) may also be replaced with another distance measuring function.

Using the data from coordinate plane 420, the new spawning location may be determined.

FIG. 5 is a schematic of optimized player positioning based on bi-partite graphs, in accordance with some implementations. As shown, an optimized or improved spawn position 501 for a new user 510 may be located within the virtual environment 502. It is noted that the virtual environment 502 is roughly equivalent to the virtual environment mapped in diagram 402 (and FIGS. 2-3). As such, known users 1, 2, 3, 4, and 5 are also represented on the diagram 402, while the new user 510 is not.

Accordingly, based upon the information obtained through examination of the coordinate plane 420, the optimized or improved spawn position 501 represents a spawn position having improved chances of the new user 510 having a visibility radius that includes a user (e.g. 204), an activity (e.g., $G_0$), and other users and activities to which the user 510 is likely to engage with, based upon activity information. The activity information may include a list or ranking of established friendships or prior interactions with activities $G_0$ and $G_2$ (or activities similar to $G_0$ and $G_2$), and the new spawn position 501 may take into consideration the list or established friendships and prior interactions through simple calculations of nearest neighbors on the coordinate plane 420.

As described above with reference to FIG. 4 and FIG. 5, activity-informed factors allow the player positioning engine 106 to initially spawn a user's avatar in an optimized or improved position that is likely to increase engagement in proximate activities of a virtual experience almost immediately upon spawning.

While described above with reference to social and activity engagement, the same may be varied in many ways. For example, other engagement metrics may be used to determine player positioning.

In one implementation, "spend-optimized positioning" (e.g., positioning users such that they are more likely to spend currency) may be implemented instead of, or in lieu of, or in combination with, social and/or activity-based positioning. In this example, positioning would be based on a graph that predicts how likely a user is to purchase an entity (or in the presence of an entity—similar to an activity that promotes transactions).

For example, given a graph that captures a user's previous engagement and relationships with different entities (e.g., another user, experience, activity, etc.), spend-optimized positioning can be optimized (or nearly optimized) to position the user with different objectives. Given a graph where edges correspond to the amount of time spent together (with users, playing experiences, etc.), the system will position the user close to entities they will engage with the longest. Other metrics can be optimized for as well, such as spend (experiences that encourage purchases or items that the user is likely to purchase can be positioned close to the new player). In this way, the definition of the graph that is used to learn the player's embeddings will result in different optimal positions on the map.

In some implementations, other engagement metrics may be used similar to social, activity, and spend engagement metrics described herein.

Hereinafter, a more detailed discussion of methods of automatic player positioning are described with reference to FIGS. 6-7.

Figure 6:
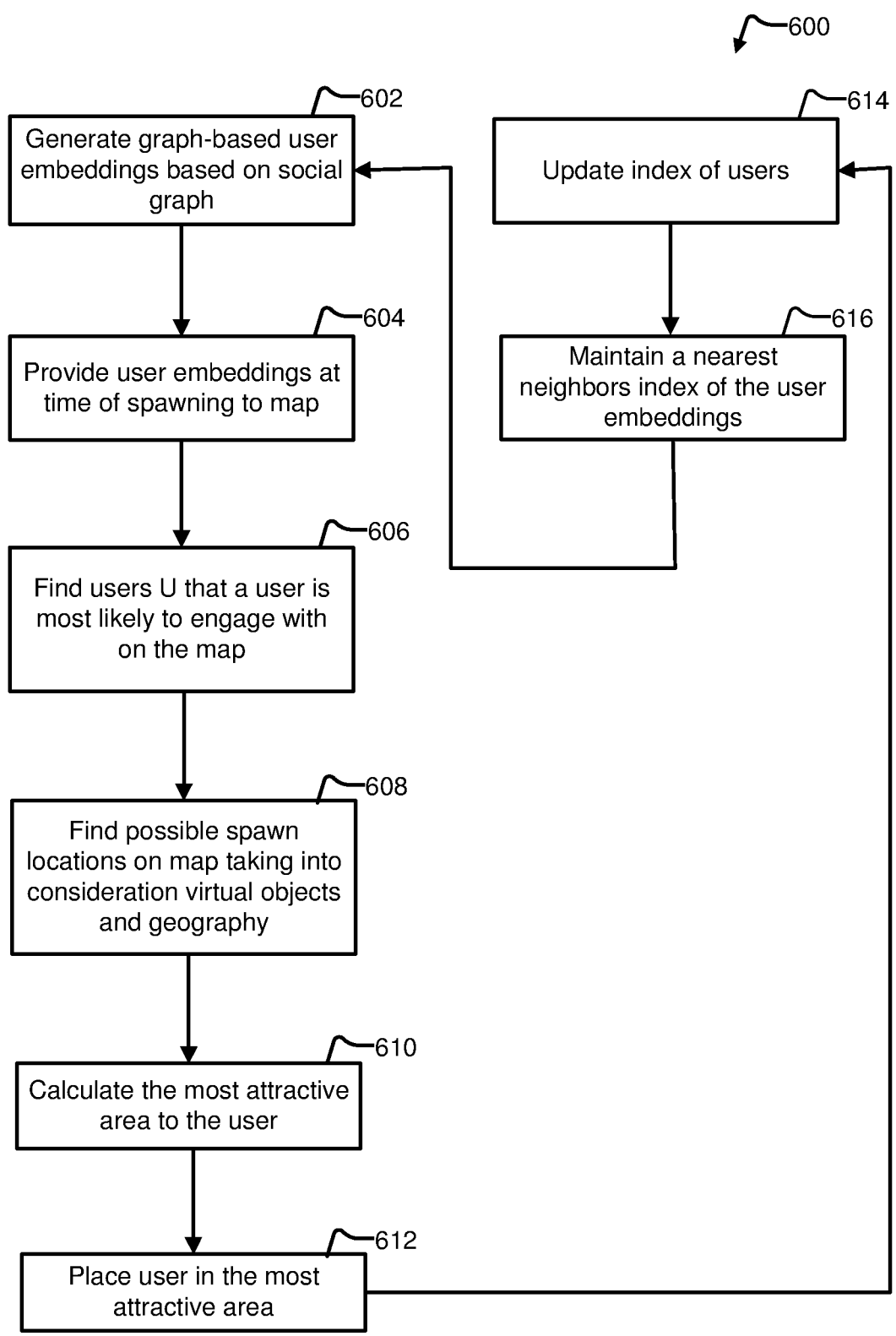
FIG. 6 is a flowchart of an example method to automatically position a player based on socially-optimized positioning, in accordance with some implementations.

FIG. 6: Example Method to Automatically Position a Player Based on Social-Informed Factors FIG. 6 is a flowchart of an example method 600 to automatically position a player based on socially-optimized positioning, in accordance with some implementations. In some implementations, method 600 can be implemented, for example, on a server system, e.g., online virtual experience platform 102 as shown in FIG. 1. In some implementations, some or all of the method 600 can be implemented on a system such as one or more client devices 110 and 116 as shown in FIG. 1, and/or on both a server system and one or more client systems. In described examples, the implementing system includes one or more processors or processing circuitry, and one or more storage devices such as a database or other accessible storage. In some implementations, different components of one or more servers and/or clients can perform different blocks or other parts of the method 600. Method 600 may begin at block 602.

In block 602, graph-based user embeddings based on social graphs are generated. The graph-based embeddings aim to predict the likelihood of a user engaging with one another upon spawning and/or player positioning. In some implementations, a cosine distance function is used to calculate the predicted likelihood of the user engaging with other users based on location of spawn.

In some implementations, block 602 may utilize activity information, spend information, or other engagement information in addition to, in combination with, or in lieu of, social information. Block 602 may be followed by block 604.

In block 604, user embeddings at the time of spawning to map are provided. For example, a graph such as diagram 202 or 402 may be received. The graph may be input into a trained model that translates the nodes onto a coordinate plane such as planes 220 or 420. Thereafter, the planes (e.g., 220 or 420) may be read or accessed by the method 600. Block 604 may be followed by block 606.

In block 606, a group of users U that a user is more likely to engage with on the map are discovered. For example, other users that will be within the vicinity of an anticipated position may be retrieved from a nearest neighbors index. The nearest neighbors index may be based upon a distance function (e.g., such as a cosine distance function).

The nearest neighbors index organizes all of the embeddings of the users on a graph that represents a virtual environment such that an approximation of the embeddings (of existing players) closest to the new user's embedding can be determined. Alternatively, the closest N points to a new point (e.g., a spawning location) may be determined by calculating the distance between the new user's embedding and the embeddings of each of the existing users. It is noted that the users with the closest embeddings (e.g., nearest neighbor embeddings) are the users that the new user is most likely to engage with. Block 606 may be followed by block 608.

In block 608, possible spawn positions on the map are discovered while taking into consideration virtual objects, virtual borders, other users, virtual activities, and other factors. For example, a radius or "visibility radius" may be drawn about an anticipated position. This radius may inform the player positioning engine 106 on a likelihood of a user engaging upon placement in this area. Accordingly, a map of a virtual environment may be divided into visibility regions based upon established visibility radii for each user. The calculation may be repeated for a plurality of anticipated spawn positions. Block 608 may be followed by block 610.

In block 610, an improved or most attractive area for spawning is calculated. For example, a weighted average of social distances d of closest friends in a particular area may be calculated. The weighted average may be calculated according to Equations 1 and 2, provided below.

$$Ai = 1/ni * (dx + \ldots + dy) \qquad \text{Equation 1.}$$

In Equation 1, ni is the number of closest players in area i and (dx+ . . . +dy) is the sum of their social distances from the new player (e.g., player being positioned).

$$\text{Choose area } Az \text{ such that } Az = \max(A1 \ldots Am) \quad \text{Equation 2.}$$

In Equation 2, Az is the are selected for the new player and it is that area which has the highest average social distance. Effectively, the player positioning engine 106 counts the number of top users ("top" meaning "most likely to engage with") visible at each possible position with an associated weight that represents how attractive that user is to the newcomer (e.g., the weight is associated with how close their embeddings are→the closer the embeddings the heavier the weight).

Upon calculating the most attractive area, block 610 may be followed by block 612.

In block 612, a user is spawns, placed, and/or positioned in the improved or most attractive area. The exact spawn position is the weighted average (weighted by social distances d) of the locations of local friends. Therefore, the spawn position with the greatest associated weight may be chosen by the player positioning engine 106. In scenarios with multiple locations with similar weights, any such location may be chosen. Block 612 may be followed by block 614.

In block 614, an index of active users within a particular virtual experience is updated. For example, the new user is added to the (approximate) nearest neighbors index so that when another new user is added to the map, the player positioning engine 106 can account for the new user when finding their "top" user (e.g., "nearest neighbors" and/or. "users most likely to engage with"). Block 614 may be followed by block 616.

In block 616, a nearest neighbors index of the user embeddings is maintained, and the method 600 may be iterated based on new users joining, users leaving, and other considerations.

In some implementations, various portions of method 600 may be repeated periodically. Blocks 602-616 can be performed (or repeated) in a different order than described above and/or one or more blocks can be omitted.

Hereinafter, an alternative method of automatic player positioning based on activity-informed factors is described in detail.

Figure 7:
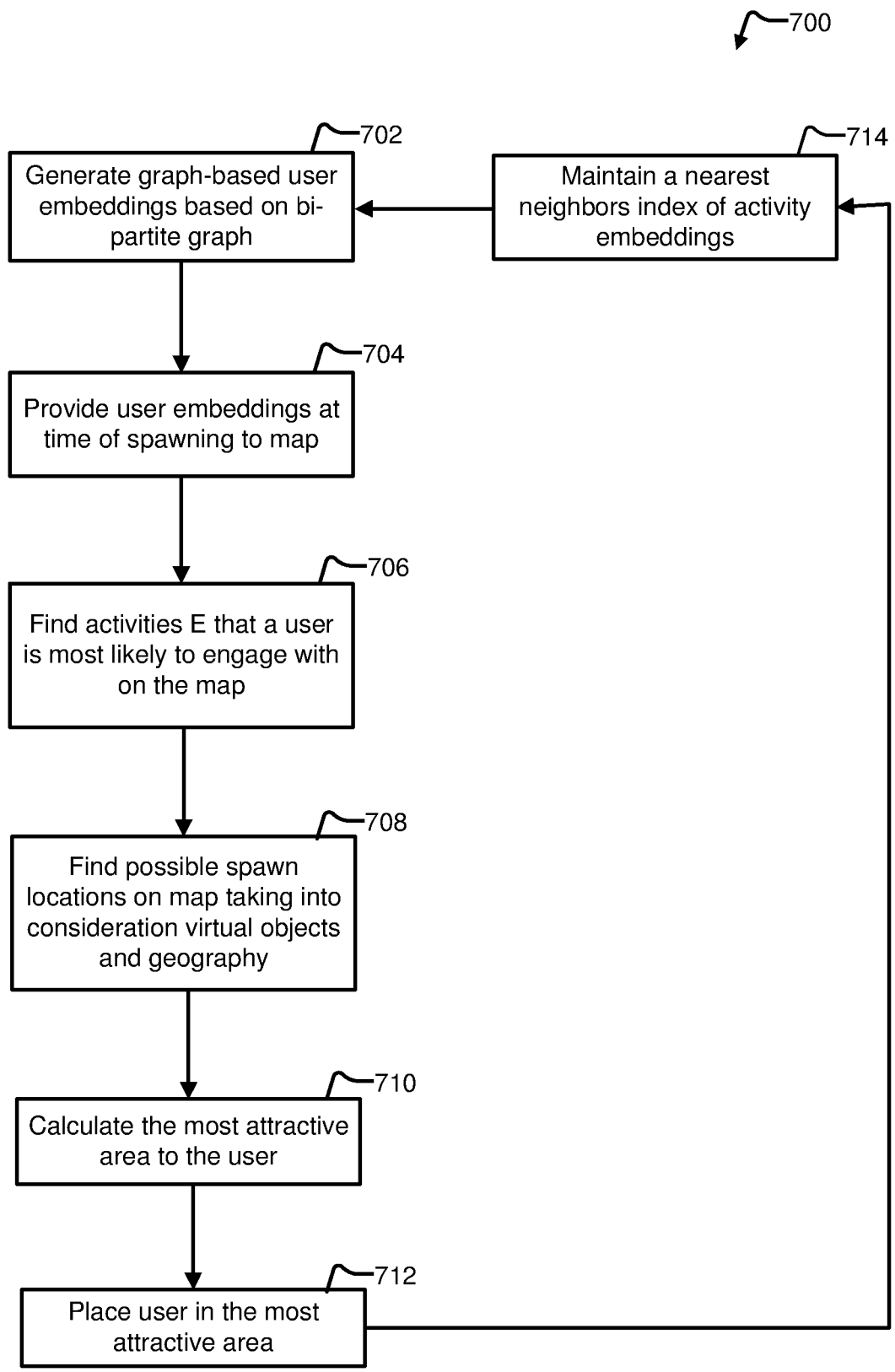
FIG. 7 is a flowchart of an example method to automatically position a player based on activity-optimized positioning, in accordance with some implementations.

FIG. 7: Example Method to Automatically Position a Player Based on Activity-Informed Factors FIG. 7 is a flowchart of an example method to automatically position a player based on activity-optimized positioning, in accordance with some implementations. In some implementations, method 700 can be implemented, for example, on a server system, e.g., online virtual experience platform 102 as shown in FIG. 1. In some implementations, some or all of the method 700 can be implemented on a system such as one or more client devices 110 and 116 as shown in FIG. 1, and/or on both a server system and one or more client systems. In described examples, the implementing system includes one or more processors or processing circuitry, and one or more storage devices such as a database or other accessible storage. In some implementations, different components of one or more servers and/or clients can perform different blocks or other parts of the method 700. Method 700 may begin at block 702.

In block 702, graph-based user embeddings based on bi-partite graphs are generated. The graph-based embeddings aim to predict the likelihood of a user engaging with an activity upon spawning and/or player positioning. In some implementations, a cosine distance function is used to calculate the predicted likelihood of the user engaging with other users based on location of spawn.

In some implementations, block 702 may utilize social information, spend information, or other engagement information in addition to, in combination with, or in lieu of, activity information. Block 702 may be followed by block 704.

In block 704, user embeddings at the time of spawning to map are provided. For example, a graph such as diagram 202 or 402 may be received. The graph may be input into a trained model that translates the nodes onto a coordinate plane such as planes 220 or 420. Thereafter, the planes (e.g., 220 or 420) may be read or accessed by the method 700. Block 704 may be followed by block 706.

In block 706, a group of activities E that a user is more likely to engage with on the map are discovered. For example, activities that will be within the vicinity of an anticipated position may be retrieved from a nearest neighbors index. Block 706 may be followed by block 708.

In block 708, possible spawn positions on the map are discovered while taking into consideration virtual objects, virtual borders, other users, virtual activities, and other factors. For example, a radius or "visibility radius" may be drawn about an anticipated position. This radius may inform the player positioning engine 106 on a likelihood of a user engaging with proximal activities upon placement in this area. The calculation may be repeated for a plurality of anticipated spawn positions. Block 708 may be followed by block 710.

In block 710, an improved or most attractive area for spawning is calculated. For example, a weighted average of social distances d of closest activities in a particular area may be calculated. The weighted average may be calculated according to Equations 3 and 4, provided below.

$$Ai = 1/ni^{*}(dx + \ldots + dy) \quad \text{Equation 3.}$$

In Equation 3, ni is the number of closest activities in area i and (dx+ . . . +dy) is the sum of the engagement scores related to the new player (e.g., player being positioned).

$$\text{Choose area } Az \text{ such that } Az = \max(A1 \ldots Am) \quad \text{Equation 4.}$$

In Equation 4, Az is the are selected for the new player and it is that area which has the highest average score.

Upon calculating the most attractive area, block 710 may be followed by block 712.

In block 712, a user is spawns, placed, and/or positioned in the improved or most attractive area. The exact position is the weighted average (weighted by social distances d) of the locations of local activities. As noted above, user engagements may also be taken into consideration in some implementations. In these implementations, a highest overall weight may be calculated based upon both users and activities to determine the exact spawn position. Furthermore, virtual items, virtual experience portals, and other features may also be taken into consideration with bipartite graph embeddings to determine an overall improved spawning location. Block 712 may be followed by block 714.

In block 714, a nearest neighbors index of activity embeddings is maintained, and the method 700 may be iterated based on new activities and other considerations.

In some implementations, various portions of method 700 may be repeated periodically. Blocks 702-716 can be performed (or repeated) in a different order than described above and/or one or more blocks can be omitted.

As described above, the techniques of intelligent social-informed and activity-informed player positioning may increase user engagement in an online virtual experience platform. Other engagement metrics, such as spend engagement metrics may also be applicable.

Hereinafter, a more detailed description of various computing devices that may be used to implement different devices illustrated in FIG. 1 is provided with reference to FIG. 8.

Figure 8:
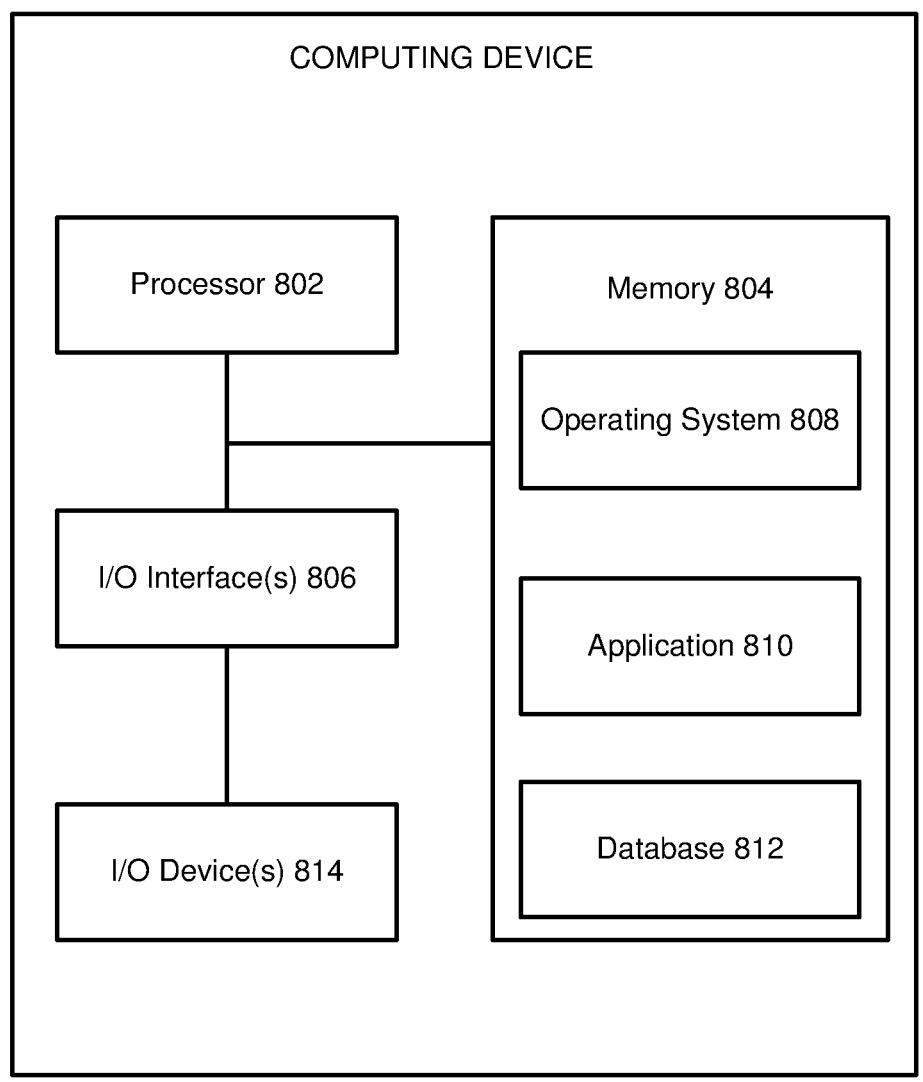
FIG. 8 is a block diagram illustrating an example computing device which may be used to implement one or more features described herein, in accordance with some implementations.

FIG. 8 is a block diagram of an example computing device 800 which may be used to implement one or more features described herein, in accordance with some implementations. In one example, device 800 may be used to implement a computer device, (e.g., 102, 110, and/or 116 of FIG. 1), and perform appropriate method implementations described herein. Computing device 800 can be any suitable computer system, server, or other electronic or hardware device. For example, the computing device 800 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 800 includes a processor 802, a memory 804, input/output (I/O) interface 806, and audio/video input/output devices 814 (e.g., display screen, touchscreen, display goggles or glasses, audio speakers, microphone, etc.).

Processor 802 can be one or more processors and/or processing circuits to execute program code and control basic operations of the device 800. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 804 is typically provided in device 800 for access by the processor 802, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 802 and/or integrated therewith. Memory 804 can store software operating on the server device 800 by the processor 802, including an operating system 808, an application 810 and associated data 812. In some implementations, the application 810 can include instructions that enable processor 802 to perform the functions described herein, e.g., some or all of the methods of FIGS. 6 and 7.

For example, memory 804 can include software instructions for an application 810 that can provide improved or optimized player positioning within a virtual experience of an online virtual experience platform (e.g., 102). Any of software in memory 804 can alternatively be stored on any other suitable storage location or computer-readable medium. In addition, memory 804 (and/or other connected storage device(s)) can store instructions and data used in the features described herein. Memory 804 and any other type of storage (magnetic disk, optical disk, magnetic tape, or other tangible media) can be considered "storage" or "storage devices."

I/O interface 806 can provide functions to enable interfacing the server device 800 with other systems and devices. For example, network communication devices, storage devices (e.g., memory and/or data store 108), and input/output devices can communicate via interface 806. In some implementations, the I/O interface can connect to interface devices including input devices (keyboard, pointing device, touchscreen, microphone, camera, scanner, etc.) and/or output devices (display device, speaker devices, printer, motor, etc.).

For ease of illustration, FIG. 8 shows one block for each of processor 802, memory 804, I/O interface 806, software blocks 808 and 810, and database 812. These blocks may represent one or more processors or processing circuitries, operating systems, memories, I/O interfaces, applications, and/or software modules. In other implementations, device 800 may not have all of the components shown and/or may have other elements including other types of elements instead of, or in addition to, those shown herein. While the online virtual experience platform 102 is described as performing operations as described in some implementations herein, any suitable component or combination of components of online virtual experience platform 102 or similar system, or any suitable processor or processors associated with such a system, may perform the operations described.

A user device can also implement and/or be used with features described herein. Example user devices can be computer devices including some similar components as the device 800, e.g., processor(s) 802, memory 804, and I/O interface 806. An operating system, software and applications suitable for the client device can be provided in memory and used by the processor. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device within the audio/video input/output devices 814, for example, can be connected to (or included in) the device 800 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

The methods, blocks, and/or operations described herein can be performed in a different order than shown or described, and/or performed simultaneously (partially or completely) with other blocks or operations, where appropriate. Some blocks or operations can be performed for one portion of data and later performed again, e.g., for another portion of data. Not all of the described blocks and operations need be performed in various implementations. In some implementations, blocks and operations can be performed multiple times, in a different order, and/or at different times in the methods.

In some implementations, some or all of the methods can be implemented on a system such as one or more client devices. In some implementations, one or more methods described herein can be implemented, for example, on a server system, and/or on both a server system and a client system. In some implementations, different components of one or more servers and/or clients can perform different blocks, operations, or other parts of the methods.

One or more methods described herein (e.g., methods 600 and/or 700) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") executing on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

In situations in which certain implementations discussed herein may obtain or use user data (e.g., user demographics, user behavioral data on the platform, user search history, items purchased and/or viewed, user's friendships on the platform, etc.) users are provided with options to control whether and how such information is collected, stored, or used. That is, the implementations discussed herein collect, store and/or use user information upon receiving explicit user authorization and in compliance with applicable regulations.

Users are provided with control over whether programs or features collect user information about that particular user or other users relevant to the program or feature. Each user for which information is to be collected is presented with options (e.g., via a user interface) to allow the user to exert control over the information collection relevant to that user, to provide permission or authorization as to whether the information is collected and as to which portions of the information are to be collected. In addition, certain data may be modified in one or more ways before storage or use, such that personally identifiable information is removed. As one example, a user's identity may be modified (e.g., by substitution using a pseudonym, numeric value, etc.) so that no personally identifiable information can be determined. In another example, a user's geographic location may be generalized to a larger region (e.g., city, zip code, state, country, etc.).

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method comprising:
    generating graph-based avatar embeddings for a plurality of avatars engaged with a virtual experience hosted on a virtual experience platform, the graph-based avatar embeddings representing a map of a virtual environment of the virtual experience, avatar position within the virtual environment for each avatar of the plurality of avatars, and social engagement data for each avatar of the plurality of avatars;
    identifying avatars of the plurality of avatars that a new avatar that is not currently in the virtual environment is likely to engage with;
    determining possible spawn positions for the new avatar in the virtual environment, the possible spawn positions based upon respective distances between the identified avatars;
    calculating a plurality of spawn positions;
    ranking the plurality of spawn positions based on a weighted prediction of engagement; and
    placing the new avatar in the virtual environment at the highest ranked spawn position.

2. The computer-implemented method of claim 1, wherein generating the graph-based embeddings comprises:
    translating an avatar social graph representing the plurality of avatars as nodes onto a coordinate plane where respective distances are each a function of social interaction between individual avatars of the plurality of avatars.

3. The computer-implemented method of claim 1, wherein identifying the avatars of the plurality of avatars comprises:
    locating that avatars that are within a vicinity of a presumptive spawn position by retrieving individual avatars from a nearest neighbors index.

4. The computer-implemented method of claim 3, wherein the nearest neighbors index includes all avatars within a threshold distance as calculated using a cosine distance function.

5. The computer-implemented method of claim 1, wherein calculating a plurality of spawn positions comprises:

determining a weighted average of social distances of closest avatars within a visibility radius of a presumptive spawn position of the possible spawn positions.

6. The computer-implemented method of claim 5, wherein ranking the plurality of spawn positions comprises, if two or more weighted averages are equivalent to a maximum weighted average, randomly assigning one spawn position associated with the two or more weighted averages as the highest ranked spawn position.

7. The computer-implemented method of claim 1, wherein the graph-based avatar embeddings are based upon a social graph, and wherein the social graph comprises nodes representing the plurality of avatars and edges representing social engagement between each pair of avatars of the plurality of avatars.

8. The computer-implemented method of claim 7, wherein the social graph is a bi-partite graph further comprising additional nodes that represent virtual activities and additional edges that represent activity engagement data for each avatar of the plurality of avatars and the virtual activities.

9. The computer-implemented method of claim 8, further comprising finding a maximum weighted prediction of engagement with the virtual activities, and wherein ranking the plurality of spawn positions further comprises ranking based on the maximum weighted prediction of engagement.

10. A system comprising:
a memory with instructions stored thereon; and
a processing device, coupled to the memory, the processing device configured to access the memory and execute the instructions, wherein the instructions cause the processing device to perform operations comprising:
generating graph-based avatar embeddings for a plurality of avatars engaged with a virtual experience hosted on a virtual experience platform, the graph-based avatar embeddings representing a map of a virtual environment of the virtual experience, avatar position within the virtual environment for each avatar of the plurality of avatars, and social engagement data for each avatar of the plurality of avatars;
identifying avatars of the plurality of avatars that a new avatar that is not currently in the virtual environment is likely to engage with;
determining possible spawn positions for the new avatar in the virtual environment, the possible spawn positions based upon respective distances between the identified avatars;
calculating a plurality of spawn positions;
ranking the plurality of spawn positions based on a weighted prediction of engagement; and
placing the new avatar in the virtual environment at the highest ranked spawn position.

11. The system of claim 10, wherein generating the graph-based embeddings comprises:
translating an avatar social graph representing the plurality of avatars as nodes onto a coordinate plane where respective distances are each a function of social interaction between individual avatars of the plurality of avatars.

12. The system of claim 10, wherein identifying the avatars of the plurality of avatars comprises:
locating that avatars that are within a vicinity of a presumptive spawn position by retrieving individual avatars from a nearest neighbors index.

13. The system of claim 12, wherein the nearest neighbors index includes all avatars within a threshold distance as calculated using a cosine distance function.

14. The system of claim 10, wherein calculating a plurality of spawn positions comprises:
determining a weighted average of social distances of closest avatars within a visibility radius of a presumptive spawn position of the possible spawn positions.

15. The system of claim 14, wherein ranking the plurality of spawn positions comprises, if two or more weighted averages are equivalent to a maximum weighted average, randomly assigning one spawn position associated with the two or more weighted averages as the highest ranked spawn position.

16. The system of claim 10, wherein the graph-based avatar embeddings are based upon a social graph, and wherein the social graph comprises nodes representing the plurality of avatars and edges representing social engagement between each pair of avatars of the plurality of avatars.

17. The system of claim 16, wherein the social graph is a bi-partite graph further comprising additional nodes that represent virtual activities and additional edges that represent activity engagement data for each avatar of the plurality of avatars and the virtual activities.

18. The system of claim 17, wherein the operations further comprise finding a maximum weighted prediction of engagement with the virtual activities, and wherein ranking the plurality of spawn positions further comprises ranking based on the maximum weighted prediction of engagement.

19. A non-transitory computer-readable medium with instructions stored thereon that, responsive to execution by a processing device, causes the processing device to perform operations comprising:
generating graph-based avatar embeddings for a plurality of avatars engaged with a virtual experience hosted on a virtual experience platform, the graph-based avatar embeddings representing a map of a virtual environment of the virtual experience, avatar position within the virtual environment for each avatar of the plurality of avatars, and social engagement data for each avatar of the plurality of avatars;
identifying avatars of the plurality of avatars that a new avatar that is not currently in the virtual environment is likely to engage with;
determining possible spawn positions for the new avatar in the virtual environment, the possible spawn positions based upon respective distances between the identified avatars;
calculating a plurality of spawn positions;
ranking the plurality of spawn positions based on a weighted prediction of engagement; and
placing the new avatar in the virtual environment at the highest ranked spawn position.

20. The non-transitory computer-readable medium of claim 19, wherein the graph-based avatar embeddings are based upon a social graph, wherein the social graph comprises nodes representing the plurality of avatars and edges representing social engagement between each pair of avatars of the plurality of avatars, wherein the social graph is a bi-partite graph further comprising additional nodes that represent virtual activities and additional edges that represent activity engagement data for each avatar of the plurality of avatars and the virtual activities, wherein the operations further comprise finding a maximum weighted prediction of engagement with the virtual activities, and wherein ranking the plurality of spawn positions further comprises ranking based on the maximum weighted prediction of engagement.

* * * * *